Jan. 30, 1962 G. W. SCHNEIDER, JR 3,019,091
PNEUMATIC PROGRAMMING SYSTEM FOR COLORIMETRIC ANALYZERS
Filed Sept. 15, 1958 2 Sheets-Sheet 1
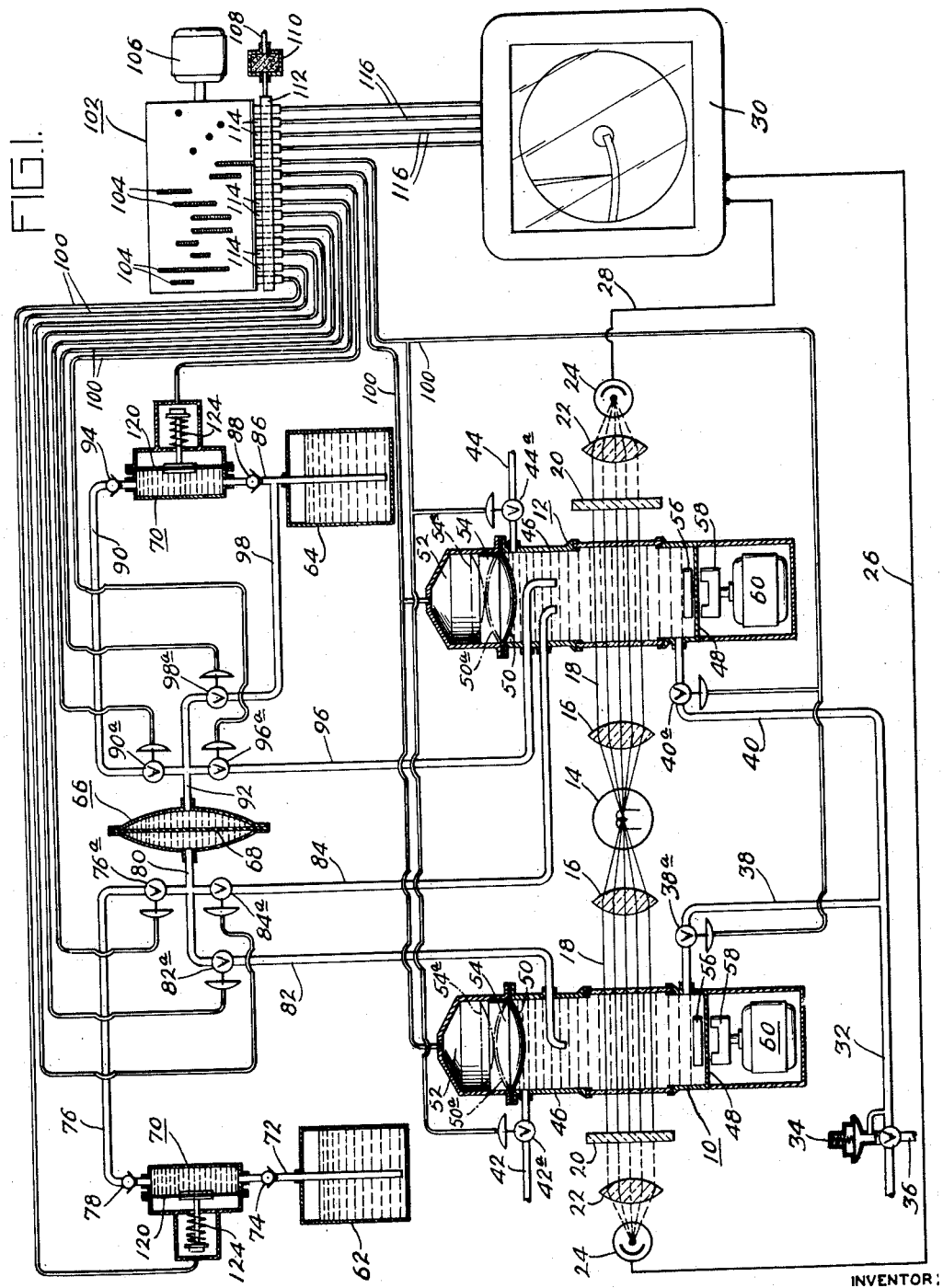
INVENTOR:
GEORGE W. SCHNEIDER, JR
BY Howson & Howson
ATTYS.

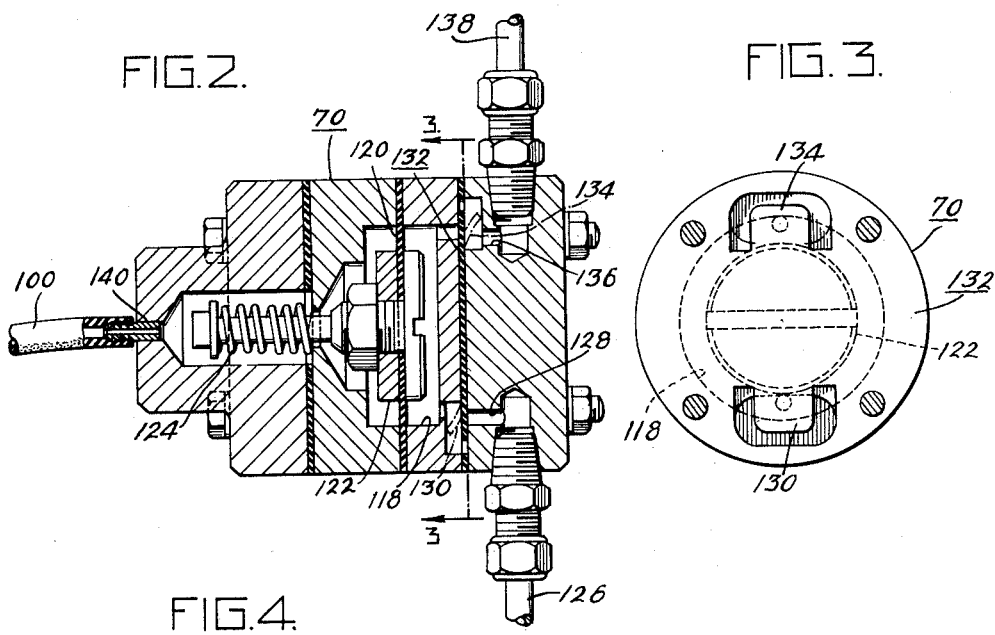
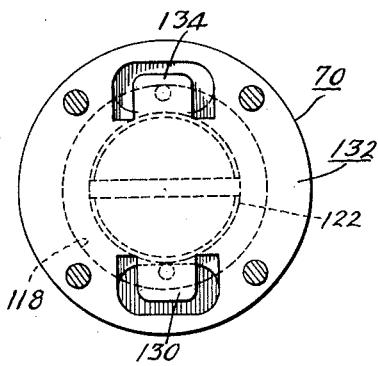
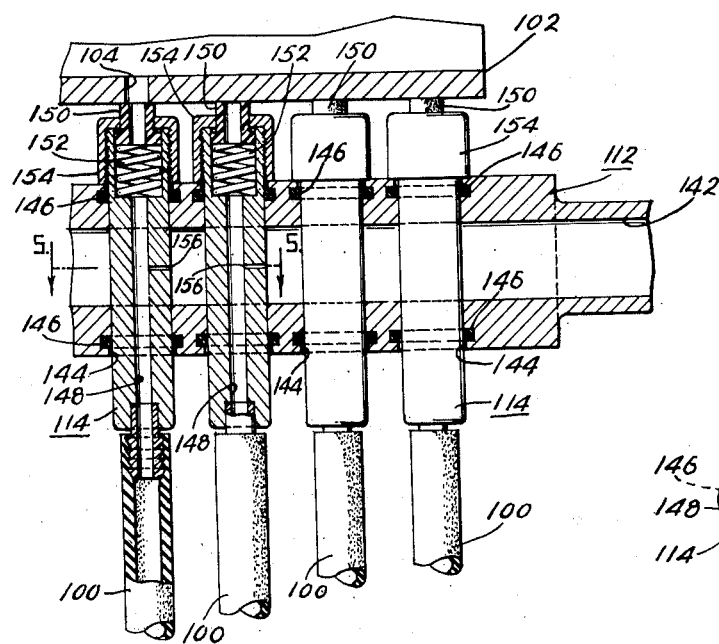
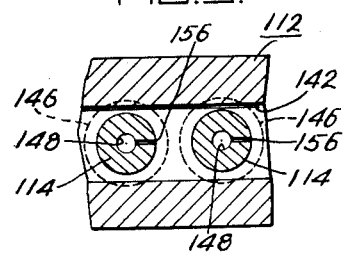

United States Patent Office 3,019,091
Patented Jan. 30, 1962

3,019,091
PNEUMATIC PROGRAMMING SYSTEM FOR COLORIMETRIC ANALYZERS
George W. Schneider, Jr., St. Petersburg, Fla., assignor to Milton Roy Company, Philadelphia, Pa., a corporation of Pennsylvania
Filed Sept. 15, 1958, Ser. No. 760,953
7 Claims. (Cl. 23—253)

The present invention relates broadly to a colorimetric type chemical analyzer, and more particularly to a colorimetric analyzer incorporating a pneumatic programming system to actuate the analyzer.

Heretofore, in colorimetric analyzers an elaborate electrical system was utilized for programming and actuating the analyzer system and apparatus. Apparatus of this type is shown in my copending application Serial No. 738,524, entitled Chemical Blank Colorimetric Analyzer, filed May 28, 1958 and assigned to a common assignee with the present application. Reference is made to this copending application for the general operating principles and characteristics of colorimetric type chemical analyzers.

The programming system utilized in my previous copending application included an elaborate system of electrical commutators, motors and solenoid actuated valves. Experience in the field has shown that such systems, while operable, are under certain circumstances unreliable and difficult to maintain.

It is a primary object of the present invention to provide a programming system and apparatus which is a simple and reliable means whereby a series of valves, diaphragm pumps and electrical switches in an automatic chemical analyzer can be programmed so that they will be actuated in the proper sequence as required for the particular analysis being conducted.

Another object of the present invention is to provide a programming system which is extremely simple in construction, easy to manufacture and very reliable in operation.

A still further object of the present invention is to provide a pneumatic programmer which actuates by means of pneumatic pressure a series of valves to control various fluid flow lines and reagent pumps, and which additionally serves to actuate a series of pressure switches to control various electrical circuits.

Another object of the present invention is to provide a programming system which is exceptionally compact, even though a large number of functions must be programmed in instruments of this type.

A still further object of the present invention is to provide programming apparatus including means to vary the air pressure applied to a system of actuating diaphragms incorporated therein.

An additional object of the present invention is to provide a pneumatic programming system which incorporates a cylindrical programming drum containing a series of slots and holes, which is slowly rotated by means of a synchronous timer motor and which slots and holes uncover selectively ports in an air bleed off system whereby air pressure in the pneumatic control tubing is reduced substantially to atmospheric pressure whereby various diaphragm valves, diaphragm pumps and pressure switches are actuated. The system utilized accordingly is an air bleed off arrangement whereby the various diaphragm valves which are normally held tightly shut by means of pneumatic pressure can open and permit fluid to pass therethrough.

Another object of the present invention is to provide a pneumatic programming system having increased flexibility to permit various chemical analyses to be performed on the same instrument by changing the pneumatic programming drum to introduce a new sequence of operation.

A still further object of the present invention is to provide a pneumatic programming system of increased flexibility lending itself to a universal type colorimetric analyzer on which a series of analyses can be performed merely by replacing the programming drum.

An additional object of the present invention is to provide a programming system, which, due to low initial cost, ease of manufacture, and reliability of operation, is broadly applicable to many different types of analytical instruments, and will provide a simple system of programming to replace known complex programming systems required by different types of apparatus.

The following detailed description of a pneumatic programming system for colorimetric chemical analysis discloses apparatus and a system for measuring dissolved oxygen in boiler water. It is to be understood however, as in my aforementioned copending application, by varying the number of reagent metering devices and reagent supply pumps, any number of analyses can be performed on the instrument such as, for example only, dissolved silica, total hardness of water, residual chlorine, fluorides and iron, etc.

Additional objects, features and advantages of the present invention will be more readily apparent from the following detailed description of an illustrative example of an embodiment thereof when taken together with the accompanying drawings in which:

FIG. 1 is a schematic diagram of a colorimetric type chemical analyzer utilizing the pneumatic programming system of the present invention;

FIG. 2 is a sectional view through a reagent pump used in the system;

FIG. 3 is a sectional view taken on line 3—3 of FIG. 2;

FIG. 4 is a fragmentary view, partly in section, of a programming drum and air bleed nozzles utilized in the system; and FIG. 5 is a sectional view taken on line 5—5 of FIG. 4.

Referring now in detail to the drawings, FIG. 1 schematically shows a colorimetric type chemical analyzer system intended for measuring dissolved oxygen in boiler water. This analyzer system utilizes a double beam colorimeter including a sample measuring cell 10 and a comparison cell 12 in spaced relationship with respect to one another. Equal volumes of the sample fluid to be tested are introduced into these cells by means hereinafter to be described in detail, and subsequently reagents are introduced into the comparison cell adapted to chemically react with the material for which the test is conducted, and will result in producing a color in the fluid contained therein in a known manner. Light beams emanating from a light source 14 pass through lens 16 and thence through each of the cells 10 and 12. The light beams 18 after passing through the cells and fluid samples contained therein pass through filters 20, thence through condensing lens 22 and impinge upon phototubes 24. In a well known manner, these phototubes act to convert the thus received light into electrical energy and this energy is transmitted through leads 26 and 28 from the sample and comparison cells respectively, to a recording instrument 30 wherein the difference in light intensity passing through the two cells is measured. As is well known, this difference in intensity can, by proper calibration, give a direct indication of the percent or amount of the material being tested for contained in the sample fluid or in the fluid utilized.

The sample fluid is introduced into the cells through conduit 32 and in the embodiment shown when testing for oxygen content at approximately 15 to 20 pounds per square inch pressure. A pressure regulating valve 34 is interposed in conduit 32 to insure proper pressures and is provided with a drain at 36.

The sample fluid is fed from conduit 32 through branch conduits 38, 40 into cells 10 and 12 respectively.

Pressure actuable diaphragm valves 38a and 40a respectively are inserted in branch conduits 38 and 40 for control of the flow of fluid therethrough, and are actuated by the system as will appear hereinafter.

Outlet conduits 42 and 44 connect into the interior of cells 10 and 12 respectively, in proximity to the top thereof, and these conduits have air operated diaphragm valves 42a and 44a interposed respectively in the conduits 42 and 44.

The sample cells 10 and 12 are completely enclosed to prevent the possibility of contamination of the sample fluids by atmospheric air. These sample cells also are of expansible volume for the purpose of addition of liquid reagents to the samples. The details of the construction of these expansible volume sample cells is more particularly set forth in a copending joint application of the present and Robert T. Sheen, entitled Expansible Volume Sample Cell, assigned to a common assignee with the present application, executed on even date herewith, Serial No. 760,954, filed September 15, 1958, now Patent No. 2,992,077, to which reference may be made for this construction. Briefly, however, the cell consists of a completely enclosed body member 46 with a bottom 48 and a top formed of a flexible diaphragm 50. A space 52 above the diaphragm contains a slidable piston 54 having a lower curved surface engageable with the diaphragm.

A magnetic stirrer is provided for agitation of the fluid contents of the sample cell. This includes a plastic covered bar magnet 56 within the cell body which is freely pivotable on the bottom of the sample cell. A permanent magnet 58 is rotatably carried by the shaft of motor 60. When the motor 60 rotates the permanent magnet 58, the bar magnet being magnetically coupled thereto is rotated within the contents of the sample cell and causes a stirring or agitation therein. The flexible diaphragm 50 permits the introduction into the sample cell of a metered amount of reagent following the introduction of the sample test fluid therein. When air pressure is maintained in the space 52, the piston depresses the diaphragm into the position shown in full lines. Upon release of air pressure from the space however, and the introduction of fluid reagent into the interior of the cell in addition to the fluid test sample, the volume expansion diaphragm 50 is free to float upwards to allow for this additional volume of the injected reagents. This condition is illustrated by the dotted convexed upward position of the diaphragm indicated at 50a, at which position the volume expansion piston would be at the maximum upward position against the top head of the sample measuring chamber, also as shown in dotted lines at 54a. The construction of the two cells is identical.

In order to utilize the colorimetric analysis principle it is necessary to introduce certain reagents into the test fluid in both the sample and comparison cells. When testing for dissolved oxygen, selected for illustrative purposes only, this may include the introduction of indigo carmine from reagent tank 62 into the sample cell 10 and comparison cell 12. Hydrazene or other reducing reagent is introduced from reagent tank 64 only into comparison cell 12. Upon the introduction of these reagents in proper sequence and quantities, a reaction takes place to effect a color change within the sample fluid which as pointed out hereinabove is then electrically translated by comparison of light beams passing through the two cells into a quantitative indication of the amount of substance tested for, or in this case oxygen.

For introduction of the requisite amounts of the reagents into the sample cells, a minus delta P reagent metering device 66 is utilized. Such a metering device and its operation is described in detail in my aforesaid copending application Serial No. 738,524. Basically, it consists of an outer casing with a flexible diaphragm 68 dividing the interior into two equal chambers. When fluids are supplied to either side of the diaphragm under sufficient pressure, the diaphragm is deflected by the pressure to force the fluid on one side or the other out, and at the same time fluid is entering the opposite side. Diaphragm types of reagent pumps are utilized to transfer the reagents from the reagent storage tanks 62 and 64 to the minus delta P metering device at a pressure sufficient to actuate the diaphragm.

Diaphragm pump 70 is connected by conduit 72, having check valve 74 therein, with the reagent in the reagent tank 62. This pump 70 is also connected by conduit 76, having check valve 78 therein, with a conduit 80. A conduit 82 connects into conduit 80 and serves for introduction of reagent from reagent reservoir 62 into cell 10. A conduit 84 interconnects conduit 80 and cell 12 for introduction of reagent from reservoir 62 into cell 12.

A second diaphragm type pump 70 identical in construction with the aforementioned one is connected with the contents of reagent reservoir 64 by means of conduit 86, having check valve 88 therein. A conduit 90 connects this diaphragm pump 70 with a conduit 92 opening into the other half of the minus delta P metering device 66. Conduit 90 is also provided with a check valve 94. A conduit 96 interconnects conduit 92 and the interior of cell 12 for the introduction therein of reagent from reagent reservoir 64. A further conduit 98 interconnects conduit 92 and conduit 86 and constitutes a return conduit for reagent from the minus Delta P metering device 66 to the reservoir 64 for purposes hereinafter to be set forth.

Pneumatically operable diaphragm values 76a, 82a, 84a, 90a, 96a and 98a respectively are inserted in the respective conduits 76, 82, 84, 90, 96 and 98 adapted for control of flow therethrough. Each of these valves, as also valves 42a, 44a, 38a, 40a, are interconnected by means of pneumatic control tubes 100 with a cylindrical programming drum 102 containing a series of slots and holes 104. The drum 102 is adapted for slow rotation by means of a synchronous timer motor 106. Air under pressure of approximately 20 pounds per square inch is introduced through conduit 108, passes through filter 110, into a manifold 112 through which are inserted a plurality of bleed off nozzles 114 in open communication with a bore extending the entire interior length of the manifold 112 and at one end are connected with the various tubes 100. At the opposite ends these nozzles, as will appear hereinafter, are provided with orifices for coacting with the various slots and holes 104 to effect an air bleed to vent the air contained in the various tubes to the atmosphere at preselected time intervals, governed by rotation of the drum, to effect opening of the various normally closed pneumatic valves in the different conduits to permit release of air pressure therefrom. Otherwise all of the conduits and the valves are acting under full line pressure and the various valves will remain closed.

It will be noted from FIG. 1 that pneumatic control tubes also interconnect the diaphragm pumps 70 with the drum and pneumatic control tubes 116 are used to connect to pressure switches, not shown, in recorder 30. These pressure switches are used to control various electrical circuits in a readily understandable manner.

Pressure switches can be provided to control the various electrical circuits for the agitator motors, instrument recorder, automatic zero motor, automatic zero relay and lamp brightness control. To prevent faulty operation of the instrument in the event that the air supply to the instrument should be shut off, a further pressure switch adapted to shut down the electrical circuit by shutting off the main power supply can be provided.

The details of construction of the diaphragm types of reagent pumps 70 will be more clearly apparent from FIGS. 2 and 3 of the drawings. Basically, this pump consists of a flexible pump diaphragm and an inlet and outlet check valve of a simple nature, and the pump is pneumatically actuated so that when air pressure is reduced to atmospheric pressure on the spring side of the diaphragm the spring deflects the flexible diaphragm and reagent in the storage container is sucked in through the inlet valve to the pump chamber. After completion of a suction stroke air pressure from the main supply source is again applied to the spring side of the flexible diaphragm and fluid trapped in the pump chamber is forced out through the outlet valve at a sufficient pressure to actuate the minus delta P metering device. The pump chamber has a volume many times in excess of that of the minus delta P metering device and as an example, approximately five times. There is, therefore, always an excess amount of reagent trapped in the diaphragm pump chamber and in effect it acts as an air loaded fluid accumulator.

The pump body includes a casing formed of a plurality of sections provided with an internal pump chamber 118, separated by a flexible diaphragm 120 having centrally secured thereto a plunger member 122, on the stem of which a spring 124 is so mounted as to tend to bias the diaphragm 120 in chamber 118 to the left as shown in the drawing. This will cause liquid to be sucked in through inlet conduit 126 from the reagent reservoir through inlet port 128 opening a flap valve 130 produced by cutting small flaps in the flexible gasket 132, and a similar outlet flap valve 134 covers outlet port 136 leading to outlet conduit 138. When the diaphragm is deflected to the left it will cause liquid to be sucked through the inlet 126 into the pump chamber 118 on the side thereof opposite the spring connection to the diaphragm. Upon completion of this suction stroke, air pressure is applied to air nozzle 140 connected by a tube 100 to the programming drum 102, so that the flexible diaphragm 120 is deflected to the right forcing the trapped contents of the pump chamber out through the outlet conduit 138.

The means for introduction and/or bleeding of air from the various tubes on rotation of the programming drum 102 are shown in detail in FIGS. 4 and 5. The manifold 112 is provided with a bore 142 in the interior thereof extending through substantially its entire length. A plurality of bleed off nozzles 114 are slidably floatingly mounted in openings 144 extending through the width of the manifold. O-rings 146 are utilized to prevent escape of air. These nozzles 114 are provided with longitudinally extending bores 148 open at the ends. The bores 148 and nozzles are interconnected at one end with selective ones of the tubes 100. At their opposite ends these nozzles are provided with enlarged bores in which are inserted Teflon seat members 150, the outer ends of which are held tightly against the programmer drum by means of spring pressure applied by springs 152 mounted in the bores. Screw-threaded cap members or the like 154 can be provided for maintaining the Teflon seats and springs in position in the bores.

Interiorly of the bore 142 in the manifold 112, the nozzles 114 are provided with openings or orifices 156 which interconnect the bores 148 with the interior of bore 142. The main air supply source is connected to the bore 142 and is normally held at a pressure of, for example, approximately 20 pounds per square inch. The orifices or openings 156 constitute air supply orifices to the various tubes 100, and the like, and it will be noted that accordingly the various tubes are connected directly to the main air supply.

The bores 148 in the nozzles, and the orifices in the Teflon seats 150, are many times greater in area than are the orifices 156. In one practical embodiment the orifices 156 are approximately $\frac{1}{64}$ inch in diameter and the bores 148 and orifice in the Teflon seats have approximately 36 times the area of these small orifices 156. As the programming drum 102 slowly rotates, the various slots and holes uncover the ports or orifices in various ones of the air bleed off nozzles, causing the air pressure in that particular pneumatic control tubing to be reduced to approximately atmospheric pressure, so that the various diaphragm valves, diaphragm pumps and pressure switches are actuated to open. The system therefore is an air bleed off arrangement, in that, when the open end of the air bleed off nozzles are covered by the solid programming drum, the pneumatic control tubing is at full line pressure of, for example, about 20 pounds per square inch and the various diaphragm valves are also under full pressure and held tightly shut. To actuate the valves it is necessary to bleed off this air pressure in the control tubing so that the diaphragm valves can open and permit fluid to pass through. When the Teflon seats are covered by the solid programming drum, air bleeds slowly from the main supply line into and through the small orifices 156 until the air nozzle, connecting tubing and actuated device are at a line pressure equal to that of the main supply. When the device is actuated by uncovering the Teflon seat by a slot or hole in the programming drum, the air trapped in the control tubing and actuated device bleeds off through the Teflon seat to atmospheric pressure. Since this orifice in the Teflon seat and the bores 148 have a much greater area, as set forth hereinbefore, then that of the orifices 156, the air bleeds off much faster than it can be supplied by the main supply line so that the air pressure in the nozzle, connecting tubing and actuated device drops to approximately atmospheric pressure.

It is believed that the structure and operation of the present system will be readily understood by those skilled in the art from the foregoing description. By means of arranging the various slots and holes in the programming drum in connection with various valves, diaphragm pumps and electrical switches in an automatic chemical analyzer, the sequence of operations can be properly programmed and actuated as required for the particular analysis. In the example given when testing for oxygen the system provides for injecting metered quantities of a reagent such as indigo carmine into both the sample and the comparison cells, which requires two operational cycles of the pump controlling discharge of this material and controlling valves, one for each of the cells, and only one actuation for introduction of the reducing agent which can be hydrazene into the comparison cell. The additional stroke cycle of the pump controlling the reducing agent from reservoir 64 is taken care of by the reagent return conduit 98.

Various chemical analyses can be performed on the same instrument by changing the pneumatic programming drum so that a new sequence of operation is obtained. It is possible to include additional or different reagents by varying the number of minus delta P reagent metering devices and reagent supply pumps, with a commensurate rearrangement of the opening in the drum and valving and tubing leading to the bleed off nozzles.

Manifestly minor changes in details of construction will be readily apparent to those skilled in the art to which the invention pertains without departing from the spirit and scope of the invention as defined in, and limited solely by, the appended claims.

I claim:

1. In a system for analysis of fluids for chemical constituents, a plurality of fluid test cells, a plurality of reagent reservoirs, a source of sample test fluid, conduits interconnecting said reagent reservoirs and said test fluid source with said test cells, pneumatic diaphragm valves in said conduits, pneumatic control tubes connecting a source of air under pressure to said valves for normally maintaining said valves closed and preventing fluid flow therethrough and a rotatable drum having a plurality of spaced slots and holes in the periphery thereof operable on rotation of said drum for selectively bleeding air pressure from predetermined ones of said tubes through said slots and holes to open selected ones of said valves in predetermined sequence to permit fluid flow through the conduit controlled thereby for pneumatically programming the operational cycle of said system from start to finish and thereafter repetitively recycling said system.

2. In a system as claimed in claim 1, reagent metering means in the conduits connecting said reagent reservoirs and said test cells, diaphragm reagent pumps in the conduits connecting said reagent reservoirs and said metering means, and pneumatic control tubes interconnecting said pumps and said pressure bleeding means for selectively actuating said pumps.

3. In a system as claimed in claim 2, said diaphragm pump comprising a casing having a chamber therein, a flexible diaphragm in said casing dividing said chamber into isolated fluid and plunger compartments, a plunger connected to said diaphragm, a spring connected to said plunger in said plunger compartment biassing said diaphragm to fluid intake position, a pneumatic control tube connected into said plunger compartment and adapted to introduce air under pressure therein for deflecting said diaphragm to liquid discharge position against action of said spring.

4. In a system as claimed in claim 3, fluid inlet and outlet ports opening into said fluid compartment, a flexible gasket interposed between said ports and the interior of said compartment, port valve seats in said compartment and flap check valves formed in said flexible gasket for coaction with said valve seats to close said ports.

5. In a system as claimed in claim 1, means associating ends of said pneumatic control tubes in air tight contact with the periphery of said drum whereby upon rotation of said drum selected ones of said tube ends are exposed to said slots or holes to bleed air pressure therefrom to the atmosphere.

6. In a system as claimed in claim 5, the associating means comprising an elongated manifold having a longitudinal bore therein connected to a source of air under pressure, a plurality of spaced transverse bores extending through said manifold and opening into said longitudinal bore, air bleed nozzles with passageways therethrough connected to said tube ends and slidably inserted in said transverse bores in air tight relationship, said nozzles having transverse openings extending from the exterior to the passageways therein and being of a substantially smaller cross-section area than that of said passageways and said longitudinal bore.

7. In a system as claimed in claim 6, said nozzles having spring pressed Teflon seat members carried on the free end thereof in sliding contact with the periphery of said drum in pressure sealing engagement therewith.

References Cited in the file of this patent
UNITED STATES PATENTS

| | | |
|---|---|---|
| 990,831 | Brand | May 2, 1911 |
| 1,097,706 | Doman | May 26, 1914 |
| 1,737,933 | McCaddann | Dec. 3, 1929 |
| 1,919,858 | Pettingill | July 25, 1933 |
| 2,063,140 | Allison | Dec. 8, 1936 |
| 2,576,747 | Bryant | Nov. 27, 1951 |
| 2,633,472 | Eberz | Mar. 31, 1953 |
| 2,645,245 | Maisch | July 14, 1953 |
| 2,950,396 | Schneider | Aug. 23, 1960 |

FOREIGN PATENTS

| | | |
|---|---|---|
| 1,077,943 | France | Nov. 12, 1954 |

OTHER REFERENCES

Wall: "Ind. and Eng. Chem.," vol. 50, No. 7, July 1958, pages 65A and 66A.